United States Patent
Sebald et al.

(10) Patent No.: US 9,366,295 B2
(45) Date of Patent: Jun. 14, 2016

(54) ROLLING BEARING ASSEMBLY

(71) Applicants: Wilhelm Sebald, Bad Koenigshofen (DE); Peter Gloeckner, Schweinfurt (DE); Franz-Josef Ebert, Hammelburg (DE)

(72) Inventors: Wilhelm Sebald, Bad Koenigshofen (DE); Peter Gloeckner, Schweinfurt (DE); Franz-Josef Ebert, Hammelburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/379,212

(22) PCT Filed: Mar. 1, 2013

(86) PCT No.: PCT/EP2013/054141
§ 371 (c)(1),
(2) Date: Aug. 15, 2014

(87) PCT Pub. No.: WO2013/135497
PCT Pub. Date: Sep. 19, 2013

(65) Prior Publication Data
US 2015/0030273 A1 Jan. 29, 2015

(30) Foreign Application Priority Data
Mar. 14, 2012 (DE) .......... 10 2012 203 933

(51) Int. Cl.
*F16C 19/50* (2006.01)
*F16C 37/00* (2006.01)
*F16C 21/00* (2006.01)
*F16C 27/04* (2006.01)
(Continued)

(52) U.S. Cl.
CPC ............... *F16C 37/007* (2013.01); *F16C 21/00* (2013.01); *F16C 27/04* (2013.01); *F16C 27/045* (2013.01); *F16C 33/58* (2013.01); *F16C 33/586* (2013.01); *F16C 33/664* (2013.01); *F16C 37/002* (2013.01); *F16C 19/06* (2013.01)

(58) Field of Classification Search
CPC .......... F16C 19/06; F16C 21/00; F16C 33/58; F16C 33/586; F16C 33/664; F16C 37/002; F16C 37/007; F16C 27/04; F16C 27/045
USPC .................................... 384/99, 467, 475, 476
See application file for complete search history.

(56) References Cited

U.S. PATENT DOCUMENTS 3,195,965 A * 7/1965 Van Dorn ...................... 384/475
6,293,703 B1 * 9/2001 Date ............................. 384/476
(Continued)

FOREIGN PATENT DOCUMENTS

CN 101010521 8/2007
CN 201006491 1/2008
(Continued)

*Primary Examiner* — James Pilkington
(74) *Attorney, Agent, or Firm* — Davidson, Davidson & Kappel, LLC

(57) ABSTRACT

A rolling bearing assembly, comprising at least a rolling bearing outer ring (4) of a rolling bearing, an intermediate element that surrounds the rolling bearing outer ring (4), and a housing part, into which the intermediate element (9) is inserted. The outer ring (4) is rotatably arranged in the intermediate element (9) and has a circumferential oil catching strip (6) at one of the end faces thereof, which oil catching strip is designed to convey oil into a contact zone formed between the outer ring (4) and the intermediate ring (9). A damping system having a damping recess is formed between the housing and the intermediate element (9).

5 Claims, 1 Drawing Sheet

(51) Int. Cl.
*F16C 33/58* (2006.01)
*F16C 33/66* (2006.01)
*F16C 19/06* (2006.01)

(56) References Cited

U.S. PATENT DOCUMENTS

| | | |
|---|---|---|
| 7,628,542 B2 | 12/2009 | Wada et al. |
| 2007/0009194 A1 | 1/2007 | Schelbert |
| 2009/0263067 A1 | 10/2009 | Streit et al. |
| 2011/0142386 A1* | 6/2011 | Flouros .................. 384/321 |
| 2012/0189235 A1* | 7/2012 | McNeil et al. ............. 384/475 |
| 2012/0328226 A1 | 12/2012 | Gloeckner et al. |
| 2013/0287328 A1* | 10/2013 | Frank ..................... 384/476 |

FOREIGN PATENT DOCUMENTS

| | | |
|---|---|---|
| DE | 952756 | 11/1956 |
| DE | 198 47 206 | 4/2000 |
| DE | 10322631 | * 12/2004 |
| DE | 103 40 261 | 3/2005 |
| DE | 10 2006 024 603 | 11/2007 |
| DE | 10 2008 032921 | 1/2010 |
| DE | 10 2008 059566 | 6/2010 |
| DE | 102009028509 | 2/2011 |
| DE | 102009038220 | 2/2011 |
| DE | 10 2009 056662 | 6/2011 |
| WO | WO2011/067154 | * 6/2011 |
| WO | WO 2011067650 | 6/2011 |

* cited by examiner

ROLLING BEARING ASSEMBLY

The present invention relates to a rolling bearing assembly.

BACKGROUND

A rolling bearing assembly is known, for example, from DE 10 2009 056 662 A1.

As explained in DE 10 2009 056 662 A1, a rolling bearing according to the definition of the species is a high-performance rolling bearing, in particular for use in engine bearings or main shaft bearings, in high speed gas turbines, in gears as well as in rotor bearings in helicopters.

In these types of applications for rolling bearings, operating temperatures far above 200° C. occur in a contact area between the rolling bodies and the bearing rings of such bearings, due to very high operating speeds under extremely high loads. The heat which is generated at these high rotational speeds, due to frictional power, must be reliably and quickly dissipated to avoid damage to the bearing. Rolling bearing cooling systems are used for this purpose, as are known, in principle, for example, also from DE 10 2006 024 603 A1.

In the described applications for high performance rolling bearings, axial and radial vibrations occur at the same time, which may be effectively counteracted with the aid of damping systems. A damping system of this type is known, in principle, for example, from DE 10 2008 032 921 A1.

A combined bearing cooling and damping system is known from DE 10 2009 056 662 A1, cited at the outset. In this case, an annular intermediate element is situated between a bearing outer ring and a housing, a cooling zone being provided between the outer ring and the intermediate element, and a damping system being provided between the intermediate element and the housing.

SUMMARY OF THE INVENTION

It is an object of the present invention is to refine a rolling bearing assembly, in particular for aircraft engines as well as stationary gas turbines, including a cooling system and a damping system, with respect to the prior art, in particular in view of the manufacturing and operating complexity.

This rolling bearing assembly has at least one rolling bearing outer ring of a rolling bearing, an annular intermediate element and a housing part, the rolling bearing being insertable into the housing part in such a way that the intermediate element is situated between the rolling bearing outer ring and the housing part, a first contact zone being provided between the rolling bearing outer ring and the intermediate element, and a second contact zone being provided between the intermediate element and the housing part.

A cooling system is provided in the first contact zone, the cooling system having at least one cooling recess, in particular a cooling channel, through which a coolant, in particular a fluid coolant, may flow.

A damping system is provided in the second contact zone, the damping system having at least one damping recess, via which a damping cavity, e.g., a gap, in the second contact zone may be filled with a damping medium.

In contrast to the prior art, the outer ring in the rolling bearing assembly according to the present invention is rotatably situated in the intermediate ring. A circumferential oil retaining strip is located on the front side of the outer ring, which is designed to capture oil and convey it to the first contact zone.

One advantage of the rolling bearing assembly according to the present invention is that, due to the rotating outer ring provided with an oil-retaining strip, oil which is located in the rolling bearing, for example injected on the side of the bearing, is supplied in a targeted manner to the contact zone to be cooled between the outer ring and the intermediate element, using centrifugal force.

In one preferred embodiment, the cooling system in the first contact zone is fluidically connected to the damping system in the second contact zone. A single fluid system thus provides for cooling as well as for damping of the rolling bearing assembly. The viscosity of the combined cooling and damping medium, preferably oil, is selected in such a way that both a sufficient through-flow of the first contact zone, and thus a sufficient cooling action, is achieved, as well as a sufficient damping action.

According to a first variant, the outer ring has at least one oil outlet bore on its front side opposite the oil-retaining strip. The oil outlet bore may also be formed by a groove provided between the outer ring and the intermediate element.

According to a second variant, the intermediate element has an oil transfer line connecting the first contact zone to the second contact zone. The rotation of the outer ring in this case primarily ensures that the cooling and damping medium is conveyed from the first contact zone, i.e., from the cooling system, to the second contact zone, i.e., to the damping system. In contrast to the outer ring, the intermediate element is non-rotatably situated in the housing.

BRIEF DESCRIPTION OF THE DRAWINGS

Exemplary Embodiments of the present invention are described below on the basis of figures.

DETAILED DESCRIPTION

Figure 1:
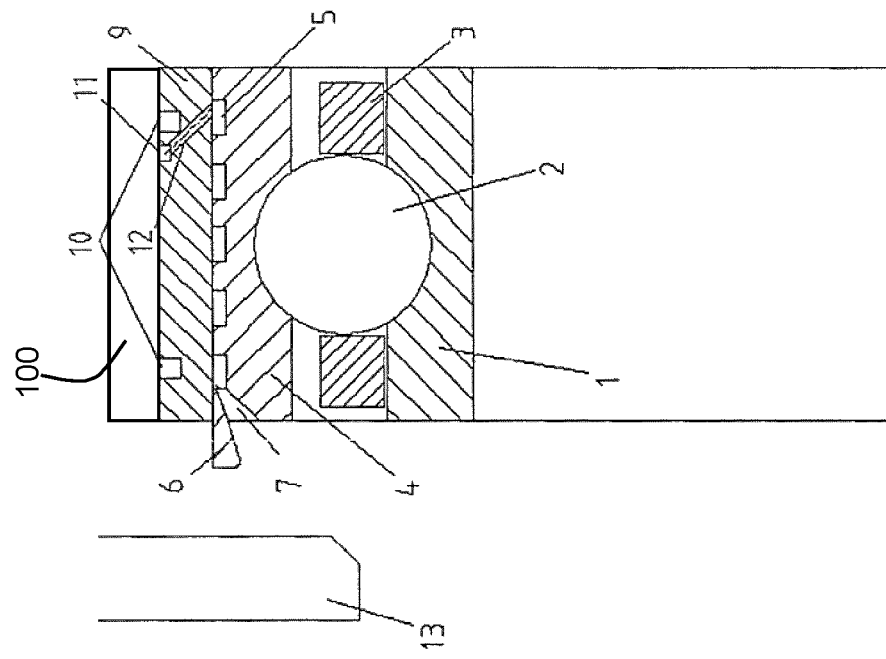
FIG. 1 shows a detail of a rolling bearing assembly in a cross-sectional representation according to a first exemplary embodiment.

Corresponding parts or parts having the same function are identified by the same reference numerals in both figures.

In both figures, a rolling bearing assembly of a jet engine is illustrated, reference being hereby made to the prior art cited at the outset with regard to its principle function. Unless otherwise noted, the following explanations relate to both exemplary embodiments.

The rolling body assembly includes bearing rings 1, 4, namely an inner ring 1 and an outer ring 4, between which rolling bodies 2, namely balls, roll, which are guided with the aid of a cage 3. A cooling channel 5 is provided in outer ring 4 on its outer circumference. Outer ring 4 is radially surrounded by an annular intermediate element 9, which is also referred to as the bearing circumferential ring. Cooling channel 5 thus forms a component of a cooling system in a first contact zone between outer ring 4 and intermediate element 9. Outer ring 4 is rotatably situated in intermediate element 9.

A second contact zone is provided between intermediate element 9 and a housing 100, in which intermediate element 9 is accommodated. A damping system is provided in this second contact zone, the damping medium, namely damping oil, is identical to the medium flowing through cooling channel 5. Intermediate element 9 is inserted into the housing secured against rotation.

The cooling and damping oil is dispensed through an oil nozzle 13, which is situated on a front side of bearing rings 1, 4. From there, it partially strikes an oil retaining strip 6, which is provided on the front side of outer ring 4. In the illustrated cross section, oil retaining strip 6 has a wedge-shaped design, the radial inner surface of oil retaining strip 6 widening toward the front side of bearing ring 4 and thus describing a conical shape. An oil bore 7, through which the cooling and damping medium captured by oil retaining strip 6 is guided to cooling channel 5, is located within bearing ring 4, directly adjacent to oil retaining strip 6. The oil is conveyed from oil retaining strip 6 through inclined oil bore 7 and on through cooling channel 5 under centrifugal force, due to the rotation of outer ring 4.

In the exemplary embodiment according to FIG. 1, the oil flowing through cooling channel 5 on the front side of outer ring 4 opposite oil retaining strip 6 exits outer ring 4 on the front side through an oil outlet bore 8 located in outer ring 4.

Figure 2:
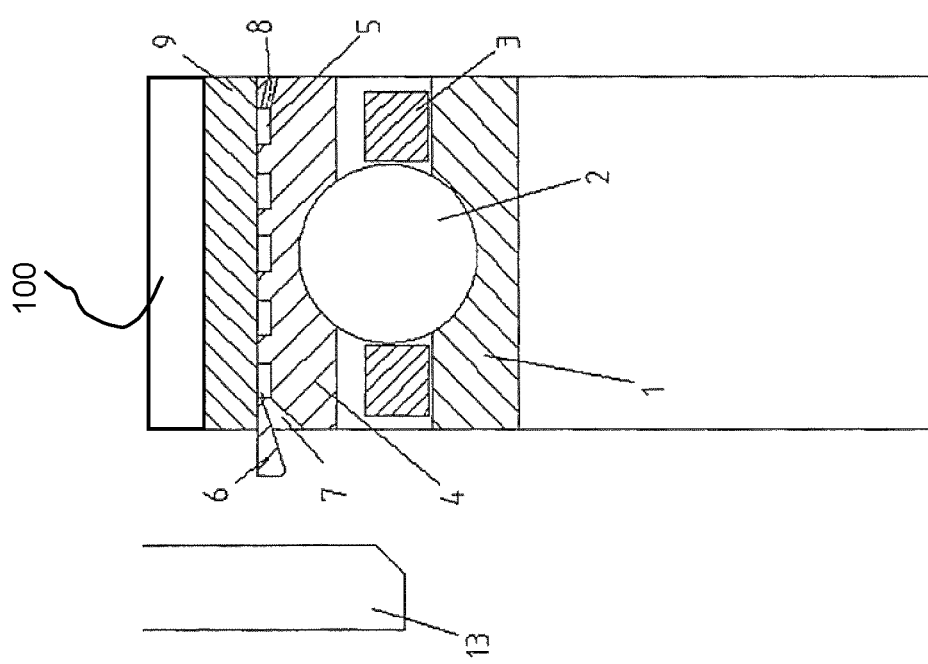
FIG. 2 shows a detail of a rolling bearing assembly in a cross-sectional representation according to a second exemplary embodiment.

In the exemplary embodiment according to FIG. 2, the oil flows from cooling channel 5 through an oil transfer line 12 located in intermediate element 9 directly to a circumferential oil distribution groove 11 on the outer surface of intermediate element 9, which is a component of the damping system. As is further apparent from FIG. 2, two piston ring grooves 10, which facilitate a sealing of the trapped oil film provided in the second contact zone, are also located on the outer surface of intermediate element 9. The damping system is supplied with oil exclusively via oil transfer line 12. Oil exiting the damping system is fed back to oil nozzle 13, which forms a closed oil circuit.

LIST OF REFERENCE NUMERALS

1 Bearing ring, inner ring
2 Rolling bodies, balls
3 Cage
4 Bearing ring, outer ring
5 Cooling channel
6 Oil-retaining strip
7 Oil bore
8 Oil outlet bore
9 Intermediate element
10 Piston ring groove
11 Oil distribution groove
12 Oil transfer line
13 Oil nozzle

The invention claimed is:

1. A rolling bearing assembly comprising:
at least one outer ring of a rolling bearing;
an annular intermediate element;
a housing, the rolling bearing being insertable into the housing in such a way that the intermediate element is situated between the outer ring and the housing, a first contact zone being provided between the outer ring and the intermediate element, and a second contact zone being provided between the intermediate element and the housing;
a cooling system being provided in the first contact zone, the cooling system having at least one cooling recess through which a coolant may flow;
a damping system being provided in the second contact zone, the damping system having at least one oil transfer line, via which a groove in the second contact zone may be filled with a damping medium,
the outer ring being rotatably situated in the intermediate element; and
a circumferential oil retaining strip provided on a front side of the outer ring and designed to convey oil to the first contact zone, wherein
the cooling system in the first contact zone is fluidically connected to the damping system in the second contact zone.

2. The rolling bearing assembly as recited in claim 1 wherein the outer ring has an oil inlet bore on a front side opposite the oil retaining strip.

3. The rolling bearing assembly as recited in claim 1 wherein the intermediate element has the oil transfer line, the oil transfer line connecting the first contact zone to the second contact zone.

4. A gas turbine bearing comprising the roller bearing assembly as recited in claim 1.

5. A helicopter comprising the roller bearing assembly as recited in claim 1.

\* \* \* \* \*